(12) United States Patent
Anderson

(10) Patent No.: US 8,340,343 B2
(45) Date of Patent: Dec. 25, 2012

(54) ADAPTIVE VIDEO FINGERPRINTING

(75) Inventor: Candace M. Anderson, Rancho Santa Fe, CA (US)

(73) Assignee: General Instrument Corporation, Horsham, PA (US)

( * ) Notice: Subject to any disclaimer, the term of this patent is extended or adjusted under 35 U.S.C. 154(b) by 1089 days.

(21) Appl. No.: 12/262,377

(22) Filed: Oct. 31, 2008

(65) Prior Publication Data

US 2010/0111352 A1    May 6, 2010

(51) Int. Cl.
G06K 9/00 (2006.01)
G06K 9/46 (2006.01)

(52) U.S. Cl. .......................... 382/100; 382/248; 382/250

(58) Field of Classification Search .................. 382/100, 382/248, 250
See application file for complete search history.

(56) References Cited

U.S. PATENT DOCUMENTS

| | | | |
|---|---|---|---|
| 5,606,616 A | 2/1997 | Sprunk et al. | |
| 5,848,155 A | 12/1998 | Cox et al. | |
| 5,915,027 A | 6/1999 | Cox et al. | |
| 5,930,369 A | 7/1999 | Cox et al. | |
| 5,991,426 A | 11/1999 | Cox et al. | |
| 6,069,914 A | 5/2000 | Cox | |
| 6,078,688 A | 6/2000 | Cox et al. | |
| 6,108,434 A | 8/2000 | Cox et al. | |
| 6,154,571 A | 11/2000 | Cox et al. | |
| 6,208,745 B1 * | 3/2001 | Florencio et al. ............. | 382/100 |
| 6,282,300 B1 | 8/2001 | Bloom et al. | |
| 6,332,194 B1 | 12/2001 | Bloom et al. | |
| 6,456,725 B1 | 9/2002 | Cox et al. | |
| 6,510,234 B1 | 1/2003 | Cox et al. | |
| 6,539,475 B1 * | 3/2003 | Cox et al. ...................... | 713/100 |
| 6,553,127 B1 * | 4/2003 | Kurowski ...................... | 382/100 |
| 6,879,701 B1 | 4/2005 | Rhoads | |
| 6,996,249 B2 | 2/2006 | Miller et al. | |

(Continued)

FOREIGN PATENT DOCUMENTS

WO    2007/080133 A2    7/2007

OTHER PUBLICATIONS

Langelaar, G.C.; Setyawan, I.; Lagendijk, R.L.; , "Watermarking digital image and video data. A state-of-the-art overview," Signal Processing Magazine, IEEE , vol. 17, No. 5, pp. 20-46, Sep. 2000.*

(Continued)

*Primary Examiner* — Bhavesh Mehta
*Assistant Examiner* — Utpal Shah
(74) *Attorney, Agent, or Firm* — Thomas A. Ward

(57) ABSTRACT

A method and system for embedding and recovering a spatial fingerprint in a sequence of video frames. The sequence includes marked frames that include marked groups having markable positions. The embedding method selects a frame offset and marking period for the marked frames, and determines a marking strength for modifying each marked group. A portion of the spatial fingerprint is embedded in each marked group of a first subgroup of the marked groups, and an ordering of the portion embedded in the first subgroup is embedded in each marked group of a second subgroup of the marked groups. The recovering method analyzes a quality ratio of the DCT transform energy and the residual for each markable position in the frame to determine whether the frame is a marked frame. The recovering method recovers the spatial fingerprint when the marked groups maintain the quality ratio in a number of successive marked frames.

12 Claims, 5 Drawing Sheets

U.S. PATENT DOCUMENTS

| | | | |
|---|---|---|---|
| 7,020,304 B2 * | 3/2006 | Alattar et al. | 382/100 |
| 7,058,223 B2 | 6/2006 | Cox | |
| 7,216,232 B1 | 5/2007 | Cox et al. | |
| 7,336,841 B2 * | 2/2008 | Neogi | 382/245 |
| 7,373,013 B2 | 5/2008 | Anderson | |
| 7,428,330 B2 | 9/2008 | Blake et al. | |
| 7,437,013 B2 | 10/2008 | Anderson | |
| 7,577,841 B2 * | 8/2009 | Celik | 713/176 |
| 7,627,135 B2 * | 12/2009 | Sakazawa et al. | 382/100 |
| 7,634,147 B2 * | 12/2009 | Neogi | 382/245 |
| 7,903,868 B2 * | 3/2011 | Kim et al. | 382/160 |
| 7,965,858 B2 * | 6/2011 | Williams | 382/100 |
| 8,009,861 B2 * | 8/2011 | Lu et al. | 382/100 |
| 8,010,988 B2 | 8/2011 | Cox | |
| 8,023,757 B2 * | 9/2011 | Neogi | 382/245 |
| 8,189,854 B2 * | 5/2012 | Watson et al. | 382/100 |
| 8,205,237 B2 | 6/2012 | Cox | |
| 2005/0100671 A1 * | 5/2005 | Kawada et al. | 427/256 |
| 2005/0135700 A1 | 6/2005 | Anderson | |
| 2007/0053438 A1 * | 3/2007 | Boyce et al. | 375/240.24 |
| 2010/0061590 A1 * | 3/2010 | Neogi | 382/100 |
| 2012/0063636 A1 * | 3/2012 | Lienhart et al. | 382/100 |

OTHER PUBLICATIONS

Eugene T. Lin and Ahmet M. Eskicioglu and Reginald L. Lagendijk and Edward J. Delp, "Advances in Digital Video Content Protection", 2005.*

M. Kutter and F.A.P. Petitcolas, "A fair benchmark for image watermarking systems", The International Society for Optical Engineering, Electronic Imaging '99. Security and Watermarking of Multimedia Contents, vol. 3657, San Jose, CA, USA, Jan. 25-27, 1999.

* cited by examiner

ADAPTIVE VIDEO FINGERPRINTING

BACKGROUND

Description of the Related Art

A typical digital or cable television system includes a hardware device, such as a set-top box, that connects a subscriber's television, and possibly other electronic equipment, to a cable or satellite network. The hardware device typically connects to the cable or satellite network via a co-axial wall outlet to receive digital content, including digital video. The owners of the digital content are interested in protecting it against illegal copying.

Cryptography protects a message by using a secret key to transform it into an unreadable encrypted format. For digital content, cryptography provides the sender with some assurance that the communication to the receiver was confidential, it does not protect against illegal copying of the digital content. Steganography is an information hiding technique that embeds a message within another seemingly harmless message. Even though steganography provides for covert communication of digital content that includes a concealed mark unknown to an attacker, a successful attack will reveal the digital content.

Watermarking and fingerprinting are two classes of techniques for copyright protection of digital content. Watermarking embeds an imperceptible mark in the digital content that identifies the sender. Upon extraction of the watermark, watermarking enables provable ownership of the digital content. Fingerprinting, which is also known as forensic watermarking, embeds an imperceptible mark in the digital content that identifies the receiver. Upon extraction of the fingerprint, fingerprint enables identification of the receiver and proof of illegal copying.

Prior art fingerprinting methods for digital video have created a large number of unique spatial fingerprints by spreading multi-byte identifiers over several video frames. These methods altered the pixel values in different locations within selected frames to specify which ones contain fingerprint information, what part of the multi-byte identifier is present, and the fingerprint bits themselves. These prior art spatial fingerprinting methods were promising, but modifications were necessary to focus on altering luminance values, and to allow for embedding and recovery of unique, visibly imperceptible, and robust fingerprints that will survive compression and other processing of video data. The advantage of these modifications is that the present invention is sufficiently simple to be implemented in a set top box with limited processing power and memory, and it can provide a large number of unique identifiers by spreading information over multiple frames.

Thus, there is a demand for a method for embedding and recovering spatial fingerprints in marked frames of a sequence of digital video frames. The presently disclosed method satisfies this demand.

SUMMARY

A method and system for embedding and recovering a spatial fingerprint in a sequence of video frames. The sequence includes marked frames that include marked groups having markable positions.

The embedding method selects a frame offset and marking period for the marked frames, and determines a marking strength for modifying each marked group. The embedding method embeds a portion of the spatial fingerprint in each marked group of a first subgroup of the marked groups, and an ordering of the portion embedded in the first subgroup in each marked group of a second subgroup of the marked groups. The embedding method may also embed a redundant copy of the ordering embedded in the second subgroup in each marked group of a third subgroup of the marked groups.

The recovering method analyzes a quality ratio of the DCT transform energy and the residual for each markable position in the frame to determine whether the frame is a marked frame. The recovering method recovers the spatial fingerprint when the marked groups maintain the quality ratio in a number of successive marked frames. The recovering method may also determine whether the quality ratio of each marked group in a second subgroup of the marked groups is in agreement with the quality ratio of each marked group in a third subgroup of the marked groups.

DETAILED DESCRIPTION

Figure 1:
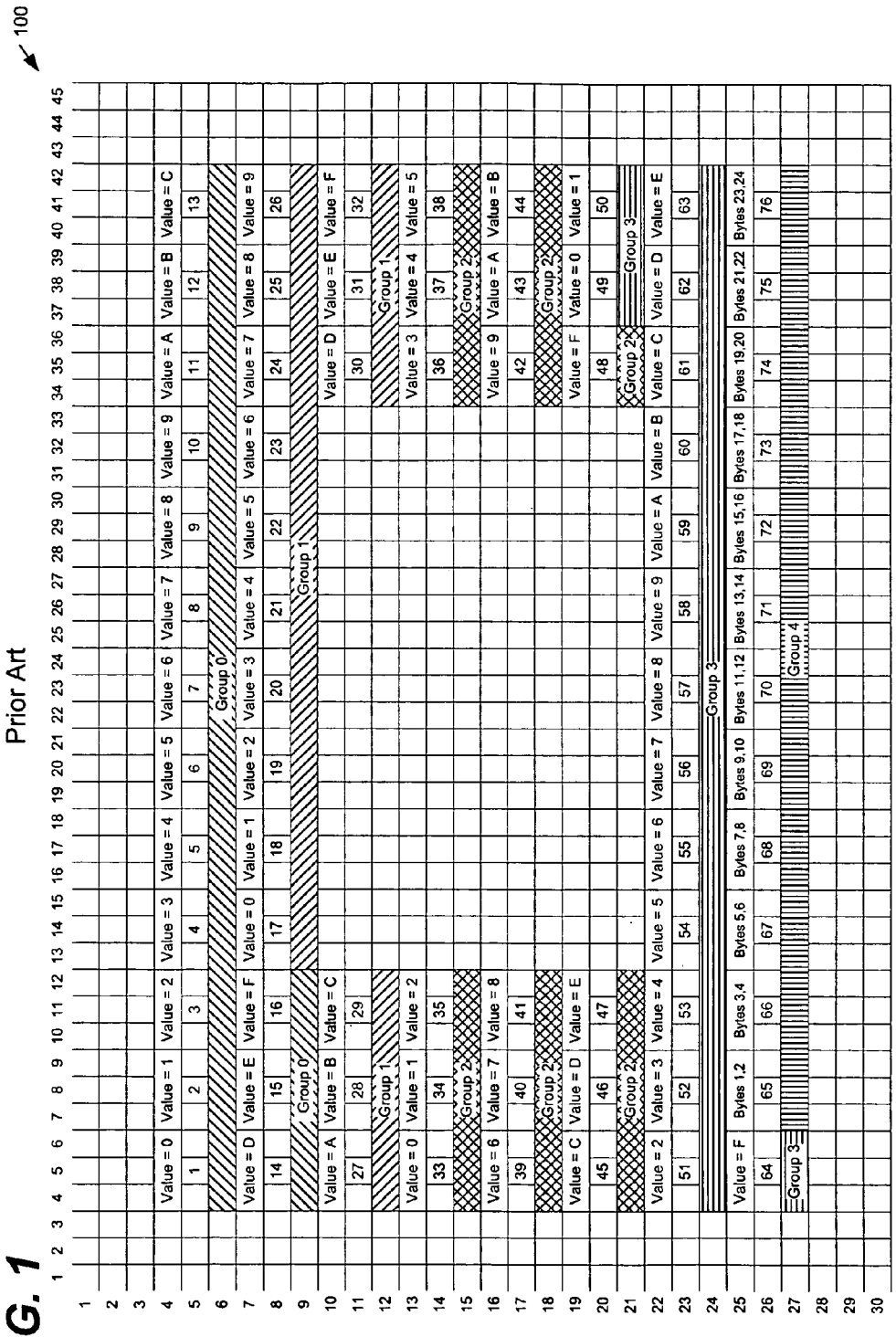
FIG. 1 illustrates the block-based grid spacing of a prior art digital video fingerprinting strategy.

FIG. 1 illustrates the block-based grid spacing of a prior art digital video fingerprinting strategy. FIG. 1 illustrates a video frame 100, having 720×480 pixels, represented as a 45×30 grid of macroblocks (MBs), where each MB represents a 16×16 block of pixels. The horizontal MBs (numbered 1 through 45) represent 720 pixels, and the vertical MBs (numbered 1 through 30) represent 480 pixels. The video frame 100 denotes marked MBs throughout the grid of MBs (numbered 1 through 76) that are subject to pixel alteration as disclosed in the present invention by the addition of "on-marking" values. The marked MBs are divided into five groups, marked MBs 1-16 are in Group 0, marked MBs 17-32 are in Group 1, marked MBs 33-48 are in Group 2, marked MBs 49-64 are in Group 3, and marked MBs 65-76 are in Group 4. Groups 0, 1, 2, and 3 carry information bits, and Group 4 is used as an index to specify where the bits in Groups 0, 1, 2, and 3 belong in the total fingerprint. The video frame 100 shown in FIG. 1 excludes the marked MBs from a 3 MB border around the frame periphery, and a 21×12 MB rectangle in the center of the frame. Furthermore, the marked MBs are spaced apart by 3 MB in each direction. As indicated by hexadecimal values [0,F] for the marked MBs in Groups 0, 1, 2 and 3, each group can encode four bits (i.e., one hex value) of the fingerprint identifier information, for a total of two bytes per frame. Group 4 includes 12 marked MBs for indicating that a frame contains fingerprint information and which byte pairs of the multi-byte identifier are given by the marked MBs of Group 0, 1, 2, and 3. Up to 48 bits can be carried in three frames (i.e., 4 bits per group and 4 groups per frame yields 16 bits per frame), and if all byte pairs were used, there would be twelve different marking frame types for a fingerprint of up to 192 bits. Even though the marked MBs shown in FIG. 1 embed a fingerprint in a digital video frame sequence, recovery of the fingerprint from the block-based grid spacing shown in FIG. 1 is complex.

Figure 2:
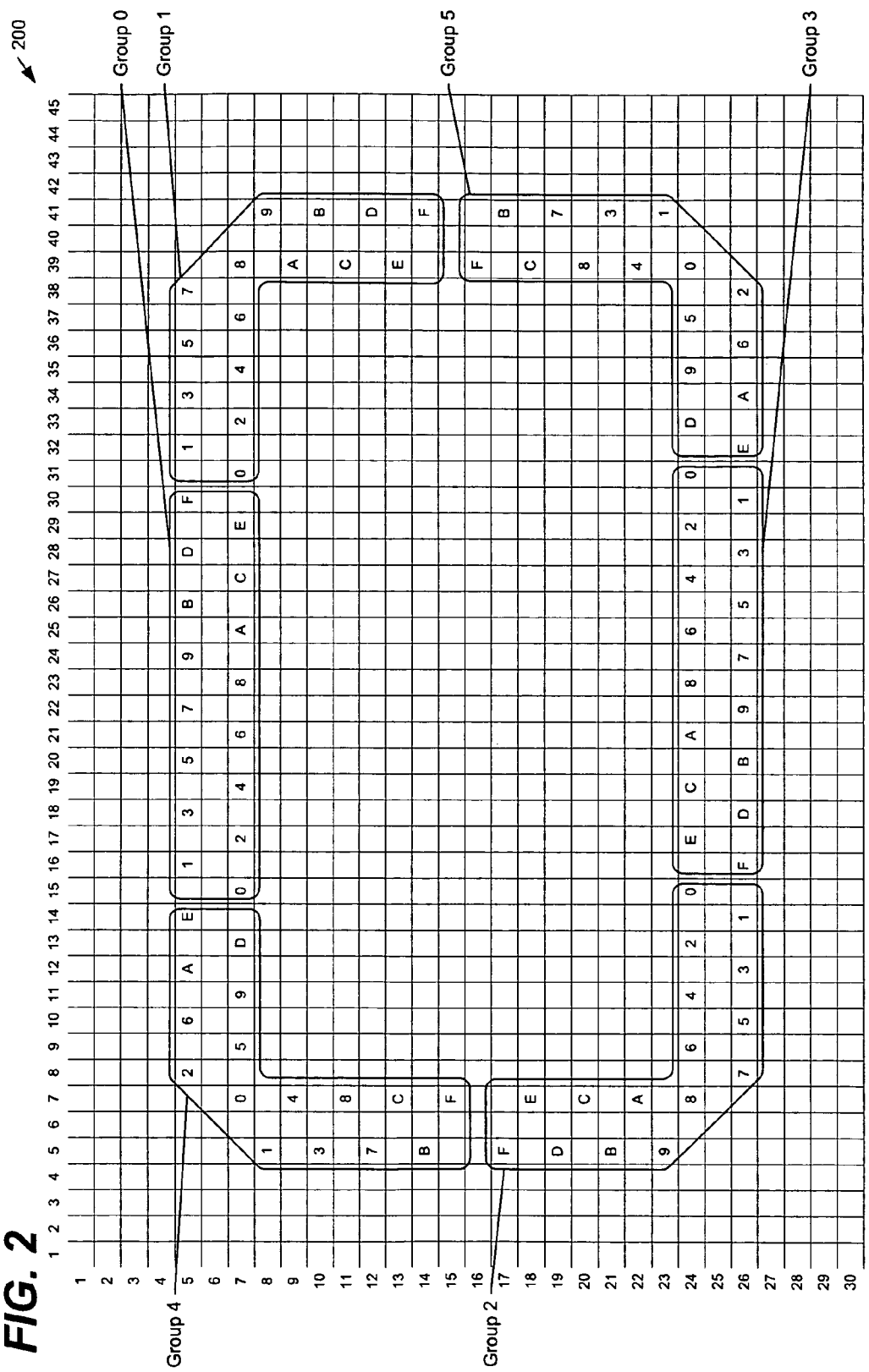
FIG. 2 and FIG. 3 illustrate one embodiment of the block-based grid spacing for an improved fingerprinting strategy.
Figure 3:
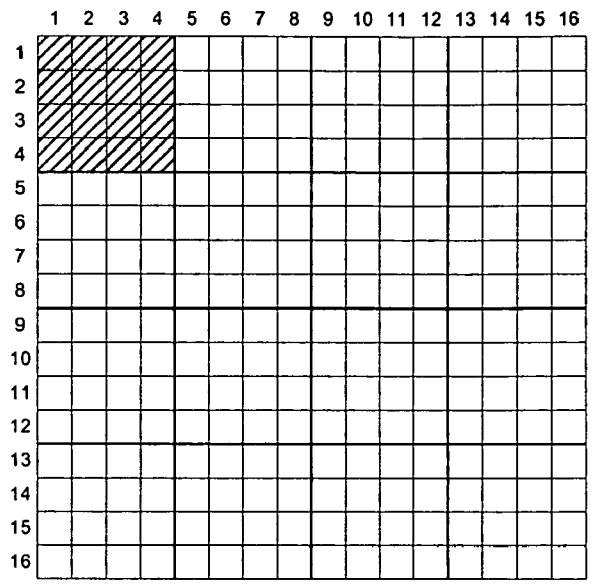

FIG. 2 and FIG. 3 illustrate one embodiment of the block-based grid spacing for an improved fingerprinting strategy. The block-based grid spacing, as shown in FIG. 2, changes the location of the marked MBs shown in FIG. 1. FIG. 2 illustrates a standard definition (SD) video frame 200, having 720×480 pixels, represented as a 45×30 grid of MBs. In another embodiment, the video frame 200 is a high-definition (HD). The horizontal MBs (numbered 1 through 45) represent 720 pixels, and the vertical MBs (numbered 1 through 30) represent 480 pixels. The video frame 200 denotes six groups of marked MBs throughout the grid of MBs (Groups 0, 1, 2, 3, 4, and 5). Each group includes 16 marked MBs (labeled 0 through F). Groups 0, 1, 2, and 3 are a subgroup that are subject to pixel alteration as disclosed in the present invention by the addition of "on-marking" values and carry information bits. FIG. 3 illustrates the 16×16 block of pixels that comprise each marked MB. As denoted by the shaded portion of the 16×16 block of pixels in FIG. 3, the present invention, in one embodiment, inserts the mark in a 4×4 block of pixels in the upper, left corner of each marked MB.

Referring again to FIG. 2, Group 4 is a subgroup that includes 16 marked MBs for indicating that a frame contains fingerprint information and is used as an index to specify where the bits in Groups 0, 1, 2, and 3 belong in the total fingerprint. Each group, including Group 4, has sixteen markable positions, allowing a maximum of 16 byte pairs for fingerprints up to 256 bits in length. Group 5 is a subgroup that includes 16 marked MBs that carry redundant information to improve retrieval of byte pair designators over what can be achieved with Group 4 marks alone. The video frame 200 shown in FIG. 2 excludes the marked MBs from at least a 4 MB border around the frame periphery, and a 31×16 MB rectangle in the center of the frame 200.

Figure 4:
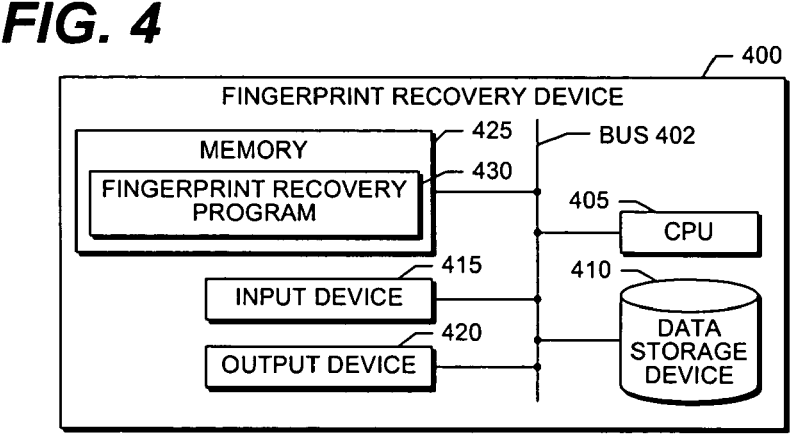
FIG. 4 is a block diagram that illustrates one embodiment of a fingerprint recovery device that performs the present invention.

FIG. 4 is a block diagram that illustrates one embodiment of a fingerprint recovery device that performs the present invention. As shown in FIG. 4, the fingerprint recovery device 400 is a general-purpose computer that provides powerful computing resources to recover a fingerprint from a sequence of digital video frames. A bus 402 is a communication medium that connects a central processor unit (CPU) 405, data storage device 410 (such as a disk drive, flash drive, flash memory, or the like), input device 415 (such as a keyboard, keypad, touchscreen, or the like), output device 420 (such as a monitor, graphic display, or the like), and memory 425.

The CPU 405 performs the disclosed methods by executing the sequences of operational instructions that comprise each computer program resident in, or operative on, the memory 425. The reader should understand that the memory 425 may include operating system, administrative, and database programs that support the programs disclosed in this application. In one embodiment, the configuration of the memory 425 of the fingerprint recovery device 400 includes fingerprint recovery program 430. The fingerprint recovery program 430 performs the method of the present invention disclosed in detail in FIG. 6. These computer programs store intermediate results in the memory 425, or data storage device 410. In another embodiment, the memory 425 may swap these programs, or portions thereof, in and out of the memory 425 as needed, and thus may include fewer than all of these programs at any one time.

Figure 5:
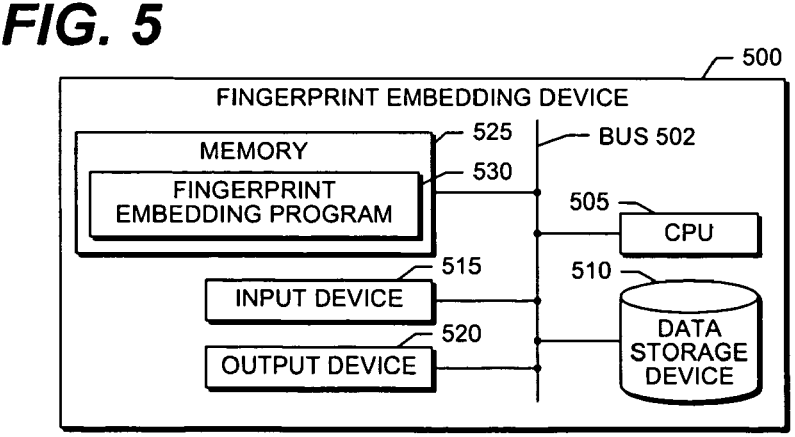
FIG. 5 is a block diagram that illustrates one embodiment of a fingerprint embedding device that performs the present invention.

FIG. 5 is a block diagram that illustrates one embodiment of a fingerprint embedding device that performs the present invention. As shown in FIG. 5, the fingerprint embedding device 500 is a general-purpose computer that performs the fingerprint embedding in real-time. In various embodiments, the fingerprint embedding device 500 is a simple and fast, limited capability device, such as a set-top box, cable converter box, satellite receiver, or the like. A bus 502 is a communication medium that connects a CPU 505, data storage device 510 (such as a disk drive, flash drive, flash memory, or the like), input device 515 (such as a keyboard, keypad, touchscreen, or the like), output device 520 (such as a monitor, graphic display, or the like), and memory 525.

The CPU 505 performs the disclosed methods by executing the sequences of operational instructions that comprise each computer program resident in, or operative on, the memory 525. The reader should understand that the memory 525 may include operating system, administrative, and database programs that support the programs disclosed in this application. In one embodiment, the configuration of the memory 525 of the fingerprint embedding device 500 includes fingerprint embedding program 530. The fingerprint embedding program 530 performs the method of the present invention disclosed in detail in FIG. 7. These computer programs store intermediate results in the memory 525, or data storage device 510. In another embodiment, the memory 525 may swap these programs, or portions thereof, in and out of the memory 525 as needed, and thus may include fewer than all of these programs at any one time.

In another embodiment, the fingerprint recovery device 400 and the fingerprint embedding device 500 are combined into a single, multi-function device. The multi-function device is simple and fact to perform the fingerprint embedding, and has a powerful CPT to perform the fingerprint recovery.

Figure 6:
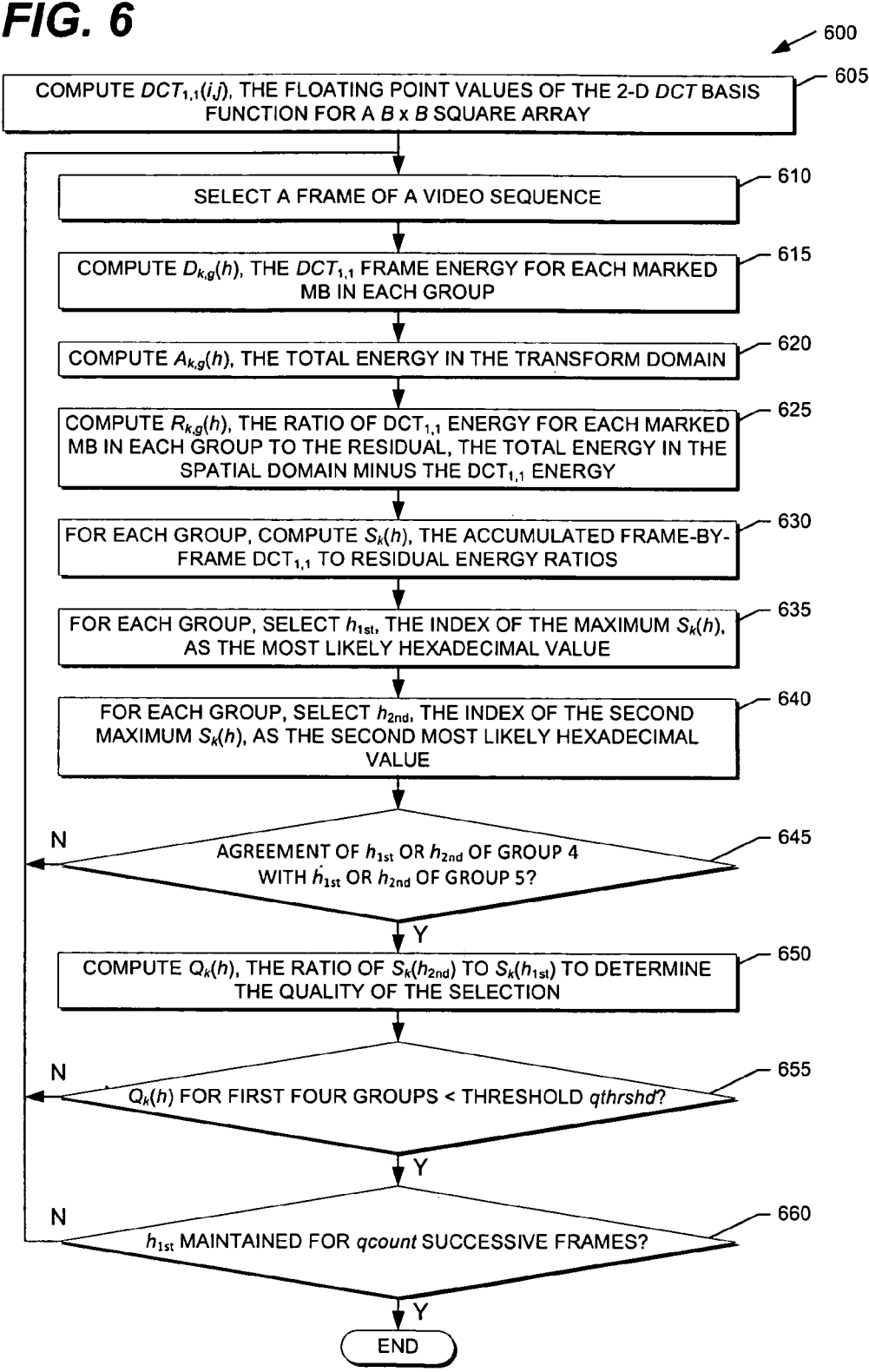
FIG. 6 is a flow chart that illustrates one embodiment of the method of fingerprint recovery for the present invention.

FIG. 6 is a flow chart that illustrates one embodiment of the method of fingerprint recovery for the present invention. Prior art fingerprint recovery methods have been based on the comparison of covariance summation of marked and unmarked luminance pixel blocks for different groups within a video frame. The present invention improves upon those prior art pure or normalized covariance methods. The fingerprint recovery method 600 illustrated in FIG. 6 searches a sequence of digital video frames to locate a number of the frames that include the fingerprint (i.e., marked frames). The first marked frame is separated from each successive marked frame by a marking period. The fingerprint recovery method 600 locates the marked frames in the sequence based on the ratio of the first diagonal Discrete Cosine Transform (DCT) coefficient of known scaling to the residual, that is, the total energy minus that of the DCT.

Using the first diagonal DCT, the fingerprint recovery method 600 computes the floating-point values of the two-dimensional $DCT_{1,1}(i,j)$ basis function for a B×B square array (step 605). The computation is given by Eqn. 1 as:

$$DCT_{1,1}(i,\ j) = \left(\frac{2}{B}\right)\cos\left(\frac{(2i+1)\pi}{2B}\right)\cos\left(\frac{(2j+1)\pi}{2B}\right) \quad \text{Eqn. 1}$$

$$i,\ j = [0, B-1]$$

which has a mean of zero and an auto-covariance $\Sigma_{i=0}^{B-1} \Sigma_{j=0}^{B-1} DCT_{1,1}^{2}(i,j)$ that is equal to unity.

The fingerprint recovery method 600 selects a frame k of a video sequence that includes embedded B×B marks based upon Eqn. 1 (step 610). The fingerprint recovery method 600 extracts the marks from the frame k by detecting the most strongly correlated square array in one of the 16 marked MBs, h=[0,15], within each of six groups, g=[0,5]. Beginning in row $i_g(h)$ and column $j_g(h)$ for a given group and marked MB, the method 600 computes the $DCT_{1,1}$ frame energies, $D_{k,g}(h)$ as given by Eqn. 2 below, for a total of 96 B×B square arrays (i.e., 16 marked MBs×6 groups) of decoded luminance pixels, $p_k(i,j)$, using the definition in Eqn. 1 in the squared summation (step 615). In another embodiment, the frame may be shifted due to processing, such as cropping, distortion, or attack such as eliminating a single column of pixels, and the fingerprint recovery method searches the frame to locate the marks in the shifted frame before computing the $DCT_{1,1}$ frame energies.

$$d_{k,g}(h) = \left( \sum_{i=0}^{B-1} \sum_{j=0}^{B-1} p_k(i_g(h)+i, j_g(h)+j) DCT_{1,1}(i,j) \right)^2 \quad \text{Eqn. 2}$$

$$h = [0,15]$$

Because the linear DCT function is orthogonal, total energy in the transform domain, $A_{k,g}(h)$, is equal to that easily computed in the spatial domain by auto-covariance of a B×B pixel block as described in Eqn. 3 (step 620). The second term in this expression below is necessary because unlike the basis function $DCT_{1,1}(i,j)$, a pixel array most probably has a mean $\mu \approx 0$.

$$A_{k,g}(h) = \left( \sum_{i=0}^{B-1} \sum_{j=0}^{B-1} p_{k,g}^2(i_g(h)+i, j_g(h)+j) \right) - B^2\mu^2 \quad \text{Eqn. 3}$$

$$h = [0,15]$$

For each group g and frame k, fingerprint mark recovery is based on comparing each of the 16 ratios of $DCT_{1,1}$ energy at each marked MB to that of the residual total energy of all $(B^2-1)$ other basis functions, $DCT_{i,j}$, where $i \ne 1$, $j \ne 1$ (step 625):

$$R_{k,g}(h) = \frac{D_{k,g}(h)}{A_{k,g}(h) - D_{k,g}(h)} \quad h = [0,15] \quad \text{Eqn. 4}$$

Denoting the first recovery frame k=0 and setting initial sums represented by $S_0(h)$ to zero, the method 600 accumulates the frame-by-frame energy ratios, $R_k(h)$ for k>0, separately for each byte pair, group, and h=[0,15] in a given frame (step 630), where $$S_k(h) = S_{k-1}(h) + R_k(h) \quad h = [0,15] \quad \text{Eqn. 5}$$

In one embodiment, the fingerprint recovery method 600 determines the byte pairs from recovered values for groups 4 and 5. In another embodiment, the method 600 extracts each of the six groups independently. At frame k, the fingerprint recovery method 600 selects the index of the maximum of the sixteen cumulative sums, $\max_h\{S_k(h)\}$ for a given group as the most likely hexadecimal value, $h_{1st}$ (step 635), and the index of the second maximum of the sixteen cumulative sums, $\max_h\{S_k(h)\}$ for a given group as the second most likely hexadecimal value, $h_{2nd}$ (step 640). If there is no agreement of $h_{1st}$ or $h_{2nd}$ of group 4 with $h_{1st}$ or $h_{2nd}$ of group 5 (i.e., between $h_{1st}$ and/or $h_{2nd}$ for group 4 and group 5) (step 645, No branch), the fingerprint recovery method 600 continues processing with the next frame in the sequence (step 610). Otherwise (step 645, Yes branch), the fingerprint recovery method 600 computes the quality of this decision as the relative value of $S_k(h)$ for the index $h_{2nd}$ having the second to the maximum cumulative sum for a given byte pair and group (step 650):

$$Q_k(h) = \frac{S_k(h_{2nd})}{S_k(h_{1st})} \quad \text{Eqn. 6}$$

The rank2-to-rank1 quality ratio in Eqn. 6 is the principal measure used in defining a stopping rule for fingerprint recovery. In one embodiment, cumulative summation of $S_k(h)$ as described in Eqn. 5 continues for each byte pair until the first four groups all yield a value of $Q_k$ less than a predetermined threshold qthrshd (step 655), each maintaining a constant $h_{1st}$ for a predetermined number qcount of successive frames (step 660). If in addition, the hexadecimal values for byte pair indicator groups, g=[4,5] agree with at least one of them yielding the same $h_{1st}$ value for frames k and k−1, recovery for that byte pair is terminated, with $h_{1st}$ values output for each of the six groups.

Figure 7:
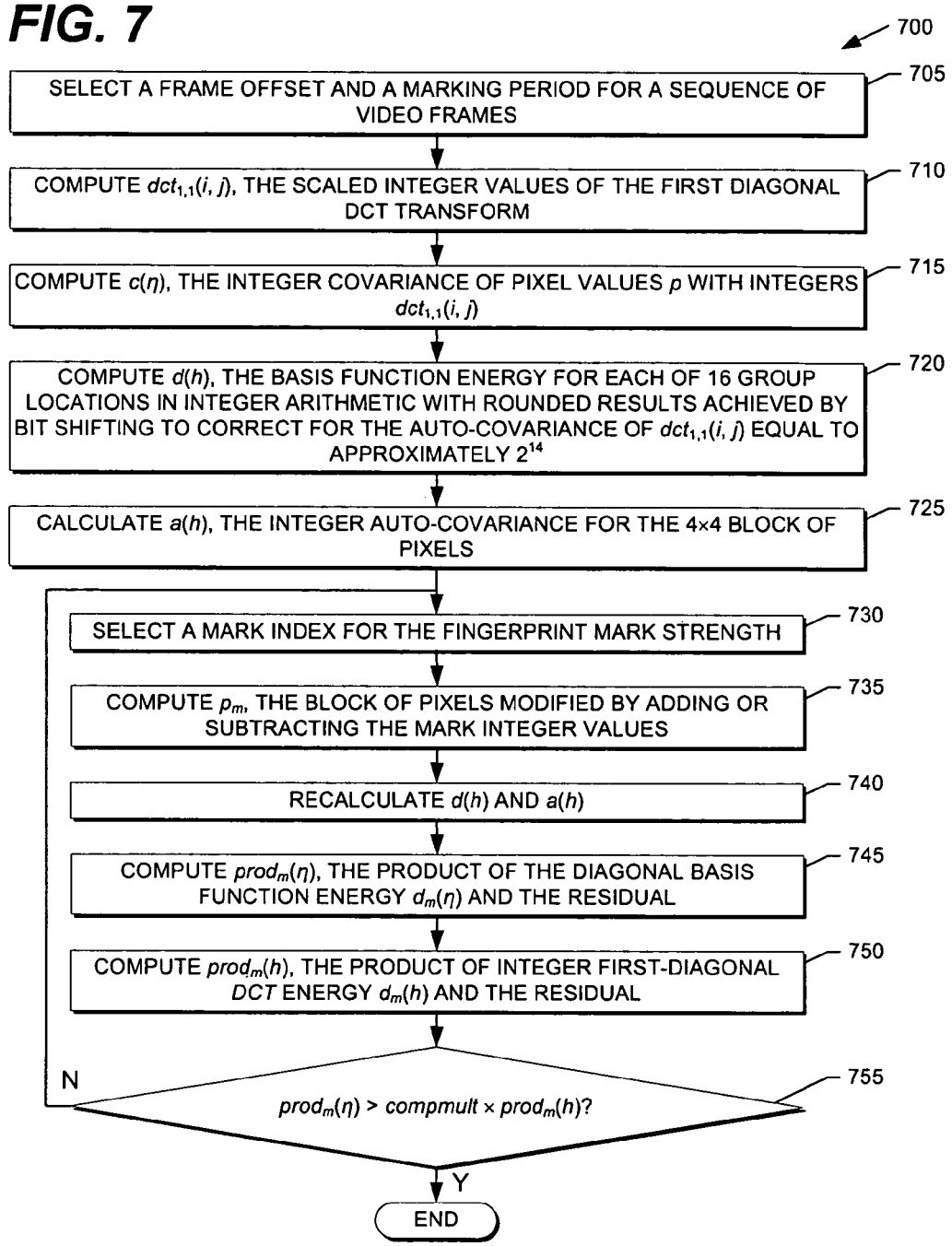
FIG. 7 is a flow chart that illustrates one embodiment of the method of fingerprint embedding for the present invention.

FIG. 7 is a flow chart that illustrates one embodiment of the method of fingerprint embedding for the present invention. In one embodiment, the fingerprint embedding method 700 substitutes the value of B=4 in Eqn. 1 of the fingerprint recovery method 600 of FIG. 6 to describe the first diagonal DCT basis function for a 4×4 square array that is smaller and less visible than another embodiment, such as substituting the value of B=8 to describe an 8×8 square array. Due to the symmetry properties of the cosine function, 16 elements of the 4×4 diagonal DCT array have up/down and right/left odd mirrored symmetry of 2×2 sub-blocks, with only 3 unique absolute values $\alpha^2$, $\alpha\beta$, and $\beta^2$ as shown in Eqn. 7.

$$DCT_{1,1}(i,j) = \frac{1}{2} \begin{Bmatrix} \alpha^2 & \alpha\beta & -\alpha\beta & -\alpha^2 \\ \alpha\beta & \beta^2 & -\beta^2 & -\alpha\beta \\ -\alpha\beta & -\beta^2 & \beta^2 & \alpha\beta \\ -\alpha & -\alpha\beta & \alpha\beta & \alpha^2 \end{Bmatrix} \quad \text{Eqn. 7}$$

Recognizing that $\alpha = \cos(\pi/8)$ and $\beta = \cos(3\pi/8) = \sin(\pi/8)$, the three unique absolute values in the above expression are given in Eqn. 8.

$$\alpha^2 = \cos^2\left(\frac{\pi}{8}\right) = \frac{1+\cos\left(\frac{\pi}{4}\right)}{2} = \frac{2+\sqrt{2}}{2} \quad \text{Eqn. 8}$$

$$\alpha\beta = \cos\left(\frac{\pi}{8}\right)\sin\left(\frac{\pi}{8}\right) = \left(\frac{1}{2}\right)\sin\left(\frac{\pi}{4}\right) = \frac{\sqrt{2}}{4}$$

$$\beta^2 = \sin^2\left(\frac{\pi}{8}\right) = \frac{1-\cos\left(\frac{\pi}{4}\right)}{2} = \frac{2-\sqrt{2}}{2}$$

Including the constant factor of ½ from Eqn. 7, the unique floating point DCT basis values are approximately equal to 0.427, 0.177, and 0.073 for the absolute values ½ $\alpha^2$, ½ $\alpha\beta$, and ½ $\beta^2$, respectively.

The fingerprint embedding method 700 begins by selecting a frame offset and a marking period for a sequence of digital video frames (step 705). The frame offset identifies the location of the first marked frame in the sequence of frames, and the marking period identifies the location of successive marked frames in the sequence.

To simplify computations for calculation of this first diagonal DCT transform, these floating point values, $DCT_{1,1}(i,j)$, are multiplied by 128 and rounded to integers, $dct_{1,1}(i,j)$ (step 710), which yields the zero-mean 4×4 array, $$dct_{1,1}(i, j) = \begin{pmatrix} 54 & 23 & -23 & -54 \\ 23 & 9 & -9 & -23 \\ -23 & -9 & 9 & 23 \\ -54 & -23 & 23 & 54 \end{pmatrix} \quad \text{Eqn. 9}$$

having an auto-covariance, $\Sigma_{i=0}^{3}\Sigma_{j=0}^{3}dct(i,j)\approx 2^{14}$ to facilitate scaling by simple bit shifting. The auto-covariance for this set of coefficients has an error of only 0.1%. In another embodiment, the floating point $DCT_{1,1}(i,j)$ values are multiplied by 32 (unique absolute values of 14, 6, 2) and the resultant is within 0.3% of approximately $2^{12}$.

Embedded 4×4 fingerprint marks of varying strengths are also generated by different scaling of the diagonal DCT basis function to integer values. Table 1 illustrates a set of 16 such marks, and provides for each mark, the scale factor, and absolute values for the corner (i.e., max=½ $\alpha^2$), edge (i.e., med=½ $\alpha\beta$), and center (i.e., min=½ $\beta^2$). The number of least significant bits (lsb's) altered at the mark corner ranges from one to seven, and the auto-covariance varies from 12 for mrk(0) to 22,700 for mrk(14).

The fingerprint embedding method selects one of the 15 marks illustrated in Table 1 based on the relative value of integer diagonal $dct_{1,1}$ transform energy for the marked location compared to that of the other 15 marked MB locations in a group. As shown in Table 1, the all zero mark is for cases where the ratio exceeds all others in the group without marking. In the block-based grid spacing shown in FIG. 2, the video frame 200 includes six marking groups, four which carry 4 bits of fingerprint information each, and two which are used to indicate that a frame is marked and to specify byte pair ordering for fingerprints of more than 16 bits.

TABLE 1

| Mark | Scale Factor | Corner | Edge | Center |
|---|---|---|---|---|
| mrk(0) | 0 | 0 | 0 | 0 |
| mrk(1) | 4 | 2 | 1 | 0 |
| mrk(2) | 12 | 5 | 2 | 1 |
| mrk(3) | 16 | 7 | 3 | 1 |
| mrk(4) | 28 | 12 | 5 | 2 |
| mrk(5) | 32 | 14 | 6 | 2 |
| mrk(6) | 40 | 17 | 7 | 3 |
| mrk(7) | 44 | 19 | 8 | 3 |
| mrk(8) | 56 | 24 | 10 | 4 |
| mrk(9) | 60 | 26 | 11 | 4 |
| mrk(10) | 72 | 31 | 13 | 5 |
| mrk(11) | 84 | 36 | 15 | 6 |
| mrk(12) | 100 | 43 | 18 | 7 |
| mrk(13) | 117 | 50 | 21 | 8 |
| mrk(14) | 128 | 55 | 23 | 9 |
| mrk(15) | 145 | 62 | 26 | 10 |

To assign strength for a particular mark, the fingerprint embedding method 700 employs an integer-based comparison analogous to the fingerprint recovery method 600 of FIG. 6. Before adding a mark to a given marked MB location to denote a hexadecimal value $\eta=[0,F]$ for a particular byte pair and group, the fingerprint embedding method 700 computes the integer covariance $c(\eta)$ of pixel values p with integers $dct_{1,1}(i,j)$ (step 715) according to Eqn. 10, $$c(\eta) = \sum_{i=0}^{3}\sum_{j=0}^{3} p(i(\eta) + i, j(\eta) + j)dct_{1,1}(i, j) \quad \text{Eqn. 10}$$

and the sign $s(\eta)=sgn(c(\eta))$ is noted for a mark applied in this location of a given frame. For comparative purposes, basis function energy d(h) is calculated for each of 16 group MB locations as in Eqn. 2, but in integer arithmetic with rounded results achieved by bit shifting to correct for the auto-covariance of $dct_{1,1}(i,j)$ equal to approximately $2^{14}$ (step 720).

$$d(h)=((c(h)+64)>>7)^2 \; h=[0,15] \quad \text{Eqn. 11}$$

The fingerprint embedding method 700 calculates the integer auto-covariance for the 4×4 block of pixels (step 725) as specified in Eqn. 3 with the mean term in Eqn. 12 for each h=[0,15] also computed by bit shifting.

$$a(h) = \sum_{i=0}^{3}\sum_{j=0}^{3} p^2(i(h) + i, j(h) + j) - \left(\left[8 + \sum_{i=0}^{3}\sum_{j=0}^{3} p(i(h) + i, j(h) + j)\right] >> 4\right)^2 \quad \text{Eqn. 12}$$

The fingerprint embedding method 700 selects a mark index from Table 1 (step 730) starting with a predetermined minimum mark index strength equal to zero. As given by Eqn. 13, the 4×4 array of pixels beginning at row $i(\eta)$ and column $j(\eta)$ is modified by the addition or subtraction of $mrk_m(i,j)$ integer values to pixel value p depending on the natural sign $s(\eta)$ determined before marking (step 735).

$$p_m(i(\eta)+i,j(\eta)+j)=p(i(\eta)+i,j(\eta)+j)+s(\eta)mrk_m(i,j) \; i=[0,3], j=[0,3] \quad \text{Eqn. 13}$$

Since marking changes both the value of basis function energy and that of pixel block auto-covariance, the quantities $d_m(\eta)$, $a_m(\eta)$ must be recomputed for each new mark index (step 740). The recalculation of $d(\eta)$ values for each new mark can be greatly simplified by saving $c(\eta)$ of unmarked pixels and pre-computing covariance of marks $mrk_m(i,j)$ and $dct_{1,1}(i,j)$ for all mark indices m=[0,15].

To avoid having to perform a division of integer first-diagonal DCT energy, d(h), by the residual (a(h)−d(h)) in Eqn. 4, comparison of a marked 4×4 pixel block and each of the other 15 in a particular group is based upon the relative value of the two products (step 745 and 750) given in Eqn. 14 for each unmarked location h for a marking index m.

$$prod_m(\eta)=d_m(\eta)(a_m(h)-d_m(h))$$

$$prod_m(\eta)=d_m(h)(a_m(\eta)-d_m(\eta)) \; h\neq\eta \quad \text{Eqn. 14}$$

Because these products can become very large, mark embedding implementation includes scaling as necessary by variable bit shifting. As the m index is incremented, a stronger mark is applied at pixel location $p(i(\eta), j(\eta))$, which raises the diagonal basis function energy $d(\eta)$ and $prod_m(\eta)$, while $prod_m(h)$ is constant and the residual $(a(\eta)-d(\eta))$ remains approximately unchanged.

Setting a predetermined comparative multiplier, compmult, provides control of the tradeoff between fingerprint robustness and visibility by selecting the minimum mark strength for each group of each frame for which (step 755):

$$prod_m(\eta)>compmult\times prod_m(h) \; \forall h\neq\eta \quad \text{Eqn. 15}$$

If this condition cannot be met due to either overflow or underflow of marked 8-bit pixel values of a mark index m equal to 15 or the maximum specified in the command line, the mark index is no longer incremented and saturation is noted.

Although the disclosed embodiments describe a fully functioning system and method for embedding and recovering spatial fingerprints in marked frames of a sequence of digital video frames, the reader should understand that other equivalent exemplary embodiments exist. Since numerous modifications and variations will occur to those reviewing this disclosure, the system and method for embedding and recovering spatial fingerprints in marked frames of a sequence of digital video frames is not limited to the exact construction and operation illustrated and disclosed. Accordingly, this disclosure intends all suitable modifications and equivalents to fall within the scope of the claims.

I claim:

1. A method for embedding a spatial fingerprint in a sequence of digital video frames, the sequence including marked frames, each marked frame including marked groups, each marked group having markable positions, comprising:
   selecting a frame offset and a marking period, the frame offset identifying a first marked frame of the marked frames, and the marking period identifying each subsequent marked frame of the marked frames;
   determining a marking strength for each marked group of each marked frame;
   for a first subgroup of the marked groups in each marked frame, embedding a portion of the spatial fingerprint in at least one markable position of each marked group in the first subgroup based on the determined marking strength; and
   for a second subgroup of the marked groups in each marked frame, embedding an ordering of the portion of the spatial fingerprint to the spatial fingerprint in at least one markable position of each marked group in the second subgroup based on the determined marking strength.

2. The method of claim 1, wherein the determining of the marking strength for each marked group of each marked frame further comprises:
   computing, for each markable position in each marked group, a first diagonal DCT transform energy;
   computing, for each markable position in each marked group, a residual;
   computing, for each markable position in each marked group, a ratio of the first diagonal DCT transform energy to the residual; and
   determining a marking value, for each marked group, by comparing the ratio for the markable positions in the marked group.

3. The method of claim 2, wherein the computing of the residual, for each markable position in each marked group, further comprises:
   computing, for each marked group, a total DCT transform energy for the marked group by summing the first diagonal DCT transform energy for each markable position in the marked group,
   wherein the residual for the markable position is the total DCT transform energy for the marked group to which the markable position belongs minus the first diagonal DCT transform energy for the markable position.

4. The method of claim 2, wherein the embedding of the portion of the spatial fingerprint in the first subgroup, and the embedding of the ordering in the second subgroup, further comprises:
   modifying said at least one markable position based on the marking value.

5. The method of claim 4, wherein each markable position includes an array of pixel values and the marking value is an array of pixel compensation values, and wherein the modifying of said at least one markable position further comprises:
   altering a portion of the array of pixel values based on the array of pixel compensation values.

6. The method of claim 1, further comprising:
   for a third subgroup of the marked groups in each marked frame, embedding a redundant copy of the ordering of the portion of the spatial fingerprint to the spatial fingerprint in at least one markable position of each marked group in the third subgroup based on the determined marking strength.

7. A system for embedding a spatial fingerprint in a sequence of digital video frames, the sequence including marked frames, each marked frame including marked groups, each marked group having markable positions, comprising:
   a memory device resident in the system; and
   a processor disposed in communication with the memory device, the processor configured to:
      select a frame offset and a marking period, the frame offset identifying a first marked frame of the marked frames, and the marking period identifying each subsequent marked frame of the marked frames;
      determine a marking strength for each marked group of each marked frame;
      for a first subgroup of the marked groups in each marked frame, embed a portion of the spatial fingerprint in at least one markable position of each marked group in the first subgroup based on the determined marking strength; and
      for a second subgroup of the marked groups in each marked frame, embed an ordering of the portion of the spatial fingerprint to the spatial fingerprint in at least one markable position of each marked group in the second subgroup based on the determined marking strength.

8. The system of claim 7, wherein to determine the marking strength for each marked group of each marked frame, the processor is further configured to:
   compute, for each markable position in each marked group, a first diagonal DCT transform energy;
   compute, for each markable position in each marked group, a residual;
   compute, for each markable position in each marked group, a ratio of the first diagonal DCT transform energy to the residual; and
   determine a marking value, for each marked group, by comparing the ratio for the markable positions in the marked group.

9. The system of claim 8, wherein to compute the residual, for each markable position in each marked group, the processor is further configured to:
   compute, for each marked group, a total DCT transform energy for the marked group by summing the first diagonal DCT transform energy for each markable position in the marked group,
   wherein the residual for the markable position is the total DCT transform energy for the marked group to which the markable position belongs minus the first diagonal DCT transform energy for the markable position.

10. The system of claim 8, wherein to embed the portion of the spatial fingerprint in the first subgroup, and to embed the ordering in the second subgroup, the processor is further configured to:

modify said at least one markable position based on the marking value.

11. The system of claim 10, wherein each markable position includes an array of pixel values and the marking value is an array of pixel compensation values, and wherein to modify said at least one markable position, the processor is further configured to:

alter a portion of the array of pixel values based on the array of pixel compensation values.

12. The system of claim 7, wherein the processor is further configured to:

for a third subgroup of the marked groups in each marked frame, embed a redundant copy of the ordering of the portion of the spatial fingerprint to the spatial fingerprint in at least one markable position of each marked group in the third subgroup based on the determined marking strength.

* * * * *